(12) United States Patent
Nagahama et al.

(10) Patent No.: US 9,803,087 B2
(45) Date of Patent: Oct. 31, 2017

(54) AQUEOUS COATING AGENT AND ARTICLE USING SAME

(71) Applicant: DIC Corporation, Tokyo (JP)

(72) Inventors: Sadamu Nagahama, Osaka (JP); Jun Shirakami, Osaka (JP)

(73) Assignee: DIC CORPORATION, Tokyo (JP)

( * ) Notice: Subject to any disclaimer, the term of this patent is extended or adjusted under 35 U.S.C. 154(b) by 120 days.

(21) Appl. No.: 14/901,905

(22) PCT Filed: Jun. 12, 2014

(86) PCT No.: PCT/JP2014/065575
§ 371 (c)(1),
(2) Date: Dec. 29, 2015

(87) PCT Pub. No.: WO2015/005054
PCT Pub. Date: Jan. 15, 2015

(65) Prior Publication Data
US 2016/0369106 A1    Dec. 22, 2016

(30) Foreign Application Priority Data

Jul. 9, 2013 (JP) ................................. 2013-143482

(51) Int. Cl.
| | | |
|---|---|---|
| *C09D 5/02* | (2006.01) | |
| *C09D 133/14* | (2006.01) | |
| *B05D 1/02* | (2006.01) | |
| *B05D 1/18* | (2006.01) | |
| *B05D 1/28* | (2006.01) | |
| *B05D 1/30* | (2006.01) | |
| *C09D 7/12* | (2006.01) | |
| *C08F 2/28* | (2006.01) | |
| *C08F 2/30* | (2006.01) | |
| *C08F 220/06* | (2006.01) | |
| *C08F 220/14* | (2006.01) | |
| *C08F 220/34* | (2006.01) | |

(52) U.S. Cl.
CPC ............... *C09D 5/024* (2013.01); *B05D 1/02* (2013.01); *B05D 1/18* (2013.01); *B05D 1/28* (2013.01); *B05D 1/305* (2013.01); *C09D 5/02* (2013.01); *C09D 7/12* (2013.01); *C09D 133/14* (2013.01)

(58) Field of Classification Search
CPC ..... C09D 5/024; C09D 133/14; C08F 220/06; C08F 220/14; C08F 220/34
USPC ................................ 524/714, 816
See application file for complete search history.

(56) References Cited

U.S. PATENT DOCUMENTS

| | | | |
|---|---|---|---|
| 5,045,616 | A | 9/1991 | Rauterkus et al. |
| 5,270,412 | A | 12/1993 | Rauterkus et al. |
| 2009/0236227 | A1 | 9/2009 | Kuzmanovic et al. |
| 2011/0033532 | A1* | 2/2011 | Angel .................. A61K 9/2018 424/465 |

FOREIGN PATENT DOCUMENTS

| | | |
|---|---|---|
| JP | S63-225669 A | 9/1988 |
| JP | H02-24310 A | 1/1990 |
| JP | H07-109379 A | 4/1995 |
| JP | H07-109394 A | 4/1995 |
| JP | H09-235332 A | 9/1997 |
| JP | 2008-050419 A | 3/2008 |
| JP | 2009-526910 A | 7/2009 |

OTHER PUBLICATIONS

Machine translation of Detailed Description of JP 2008-050419A; publication date: Mar. 2008.*
International Search Report dated Sep. 9, 2014, received in related International Application No. PCT/JP2014/065575, filed Jun. 12, 2014 (translation is provided).

* cited by examiner

*Primary Examiner* — Fred M Teskin
(74) *Attorney, Agent, or Firm* — McDermott Will & Emery LLP

(57) ABSTRACT

The present invention provides an aqueous coating agent including a vinyl polymer (A) having a basic nitrogen atom-containing group and a carboxylic group, a quaternary ammonium salt (B), and an aqueous medium (C). Particularly, the present invention provides an aqueous coating agent including a compound represented by General Formula (1) below as the quaternary ammonium salt (B). The aqueous coating agent has excellent adhesiveness, warm water resistance, corrosion resistance, and chemical resistance, and can form a film that is capable of preventing the deterioration of various substrates.

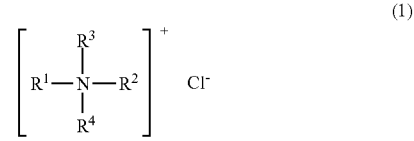

(1)

In General Formula (1), $R^1$ to $R^4$ each independently represent an alkyl group having 1 to 20 carbon atoms or an aryl group.

21 Claims, No Drawings

AQUEOUS COATING AGENT AND ARTICLE USING SAME

CROSS-REFERENCE

This application is the U.S. National Phase under 35 U.S.C. §371 of International Application No. PCT/JP2014/065575, filed Jun. 12, 2014, which claims the benefit of Japanese Application No. 2013-143482, filed Jul. 9, 2013, the entire contents of each are hereby incorporated by reference.

TECHNICAL FIELD

The present invention relates to an aqueous coating agent, which can form a film on the surface of a plastic substrate or a metal substrate, and an article using the same.

BACKGROUND ART

Generally, a coating agent is required to form a film capable of preventing the deterioration of the surface of a substrate, is required. Particularly, in recent years, a coating agent which can forma film having chemical resistance at a level of preventing the deterioration of a substrate due to the adhesion of a chemical, such as a detergent, or acid rain, besides warm water resistance or solvent resistance, has been required by the industries.

The coating agent having the above characteristics is often required for protecting the surface of a plastic substrate which is easily deteriorated due to the adhesion of a chemical or the like, or a metal substrate which is easily rusted.

As the coating agent that can be used in protecting the surface of the plastic substrate, for example, there is known an aqueous curable polymer dispersion which contains a polymer particle, a polyfunctional epoxy compound, and a water-based medium, the polymer particle being composed of at least two layers where the A phase of the layers is composed of a carboxyl group-containing polymer and the B phase of the layers is an ethylenic polymer having a basic nitrogen atom-containing group (for example, refer to PTL 1).

However, a film formed using the aqueous curable polymer dispersion fell one step short in terms of warm water resistance, corrosion resistance, and chemical resistance for the purpose of preventing the deterioration of a plastic substrate or a metal substrate over a long period of time. In particular, there was a case that the film is not practically sufficient for preventing the generation of rust from the metal substrate.

Meanwhile, in recent years, an aqueous coating agent in which a resin is dispersed in an aqueous medium has been widely used in various fields for the purpose of achieving the reduction of environmental loads.

As the aqueous coating agent, those containing various emulsifiers in order to impart excellent storage stability and compounding stability are known.

However, there was a case where storage stability or the like cannot be improved depending on the kind of a resin contained in the aqueous coating agent, whether a hydrophilic group exists, and the kind of the hydrophilic group, even when the emulsifier is used. Further, there was a problem that, when the emulsifier is used, the storage stability or the like of the aqueous coating agent is improved, but the adhesiveness of the film to a substrate, warm water resistance, corrosion resistance, chemical resistance, and the like are deteriorated.

Accordingly, an aqueous coating agent excellent in the adhesiveness of the film to a substrate, warm water resistance, corrosion resistance, and chemical resistance has been required.

CITATION LIST

Patent Literature

[PTL 1] JP-A-09-235332

SUMMARY OF INVENTION

Technical Problem

An object of the present invention is to provide an aqueous coating agent, which is excellent in adhesiveness, warm water resistance, corrosion resistance, and chemical resistance, which can form a film capable of preventing the deterioration of various substrates, and which is excellent in storage stability and compounding stability.

Solution to Problem

As a result of intensive studies in order to solve the aforementioned problem, the present inventors found that a film, which is formed using an aqueous coating agent including a vinyl polymer (A) having a basic nitrogen atom-containing group and a carboxylic group, a quaternary ammonium salt (B), and an aqueous medium (C), has excellent adhesiveness to substrate, warm water resistance, corrosion resistance, and chemical resistance, and a film capable of preventing the deterioration of various substrates can be formed. Based on the findings, the present invention has been completed.

That is, the present invention relates to an aqueous coating agent which is characterized by including a vinyl polymer (A) having a basic nitrogen atom-containing group and a carboxylic group, a quaternary ammonium salt (B), and an aqueous medium (C), and an article using the same.

Advantageous Effects of Invention

Since the aqueous coating agent of the present invention can form a film having extremely excellent adhesiveness to a substrate, warm water resistance, corrosion resistance, and chemical resistance, it can be used as a coating agent for protecting the surface of a plastic substrate, a metal substrate, or the like. Examples of the material of the plastic substrate, to which the aqueous coating agent of the present invention can be applied, include an acrylonitrile-butadiene-styrene resin (ABS resin), a polycarbonate resin (PC resin), an ABS/PC resin, a polystyrene resin (PS resin), and a polymethacrylate resin (PMMA resin). Since the aqueous coating agent of the present invention can be applied to such plastic substrates, it can be suitably used for various articles, such as mobile phones, home electric appliances, OA equipment, and automobile interior materials.

In addition, examples of the metal substrate, to which the aqueous coating agent of the present invention can be applied, include a plated steel sheet such as a zinc-plated steel sheet and an aluminum-zinc alloy steel sheet, an aluminum sheet, an aluminum alloy sheet, an electromagnetic steel sheet, a copper sheet, and a stainless steel sheet. Since the aqueous coating agent of the present invention can form a film having excellent corrosion resistance and being capable of preventing the generation of rust or the like from such metal substrates, it can be suitably used for various articles, such as building members, such as outer walls and roofs, civil engineering members, such as guardrails, soundproof walls, and drain ditches, home electric appliances, industrial machines, and automobile exterior materials.

DESCRIPTION OF EMBODIMENTS

The coating agent of the present invention includes a vinyl polymer (A) having a basic nitrogen atom-containing group and a carboxylic group, a quaternary ammonium salt (B), and an aqueous medium (C).

As the vinyl polymer (A), a vinyl polymer having a basic nitrogen atom-containing group and a carboxylic group is used.

Examples of the basic nitrogen atom-containing group include an N,N-dimethylaminoethyl group, an N,N-dimethylaminopropyl group, an N,N-diethylaminoethyl group, an N,N-dimethylaminopropyl group, an N,N-diethylaminopropyl group, a pyridinyl group, and an amino group, and preferably an N,N-dimethylaminoethyl group.

The content of the basic nitrogen atom-containing group in the vinyl polymer (A) is preferably in a range of 30 mmol/kg to 700 mmol/kg, more preferably in a range of 50 mmol/kg to 600 mmol/kg, and further preferably in a range of 80 mmol/kg to 400 mmol/kg, in terms of further improving the chemical resistance of a film of the aqueous coating agent of the present invention.

The carboxylic group of the vinyl polymer (A) imparts good water dispersion stability to the vinyl polymer (A).

The content of the carboxylic group in the vinyl polymer (A) is preferably in a range of 50 mmol/kg to 1,200 mmol/kg, more preferably in a range of 80 mmol/kg to 1,000 mmol/kg, and further preferably in a range of 100 mmol/kg to 650 mol/kg, in terms of further improving the adhesiveness of the aqueous coating agent of the present invention to a substrate. Further, it is preferable that the content of the basic nitrogen atom-containing group in the vinyl polymer (A) is within the above range, and the content of the carboxylic group in the vinyl polymer (A) is within the above range.

The molar ratio of the basic nitrogen atom-containing group to the carboxylic group [basic nitrogen atom-containing group/carboxylic group] in the vinyl polymer (A) is preferably in a range of 0.1 to 3, and more preferably in a range of 0.3 to 2.8, in terms of further improving the chemical resistance of a film of the aqueous coating agent of the present invention and the adhesiveness thereof to a substrate.

The vinyl polymer (A) can be prepared by, for example, polymerizing a vinyl monomer mixture in the presence of a polymerization initiator and the aqueous medium (C). Specifically, the vinyl polymer (A) can be prepared by radical-polymerizing a vinyl monomer mixture including a vinyl monomer having a basic nitrogen atom-containing group, a vinyl monomer having a carboxylic group, and, if necessary, other vinyl monomers.

Examples of the vinyl monomer having a basic nitrogen atom-containing group that can be used may include: vinyl monomers having a tertiary amino group, such as N,N-dimethylaminoethyl (meth)acrylate, N,N-dimethylaminopropyl (meth)acrylate, N,N-diethylaminoethyl (meth)acrylate, N,N-dimethylaminopropyl (meth)acrylate, N,N-diethylaminopropyl (meth)acrylate, N-[2-(meth)acryloyloxyethyl] piperidine, N-[2-(meth)acryloyloxyethyl] pyrrolidine, N-[2-(meth)acryloyloxyethyl] morpholine, 4-[N,N-dimethylamino] styrene, 4-[N,N-diethylamino] styrene, 2-vinylpyridine, and 4-vinylpyridine; vinyl monomers having a secondary amino group, such as N-methylaminoethyl (meth)acrylate and N-t-butylaminoethyl (meth)acrylate; vinyl monomers having a primary amino group, such as aminomethyl acrylate, aminoethyl acrylate, aminopropyl (meth)acrylate, amino-n-butyl (meth)acrylate, butyl vinyl benzylamine, vinyl phenyl amine, and p-aminostyrene. Among these, in terms of further improving chemical resistance, it is preferable to use the vinyl monomers having a tertiary amino group, and it is more preferable to use N,N-dimethylaminoethyl (meth)acrylate. Here, the "(meth)acrylate" refers to either or both of acrylate and methacrylate.

Further, examples of the vinyl monomer having a basic nitrogen atom-containing group that can be used may include N,N-dimethylaminopropyl (meth)acrylamide and N,N-dimethylaminoethyl (meth)acrylamide.

Further, examples of the vinyl monomer having a basic nitrogen atom-containing group that can be used may include (meth)acrylamide, diethyl (meth)acrylamide, N-vinyl pyrrolidone, N,N-dimethyl (meth)acrylamide, N,N-diethyl (meth)acrylamide, and N,N'-methylene bis(meth)acrylamide.

Further, a preferable example of the vinyl monomer having a basic nitrogen atom-containing group that can be used may include (meth)acrylonitrile.

Some or all of the vinyl monomers having a basic nitrogen atom-containing group may be previously neutralized by an acidic compound. Also, these vinyl monomers may be radical-polymerized to prepare the vinyl polymer (A), and then, if necessary, may be neutralized.

As the acidic compound that can be used in the neutralization, an inorganic acid or an organic acid can be used. Examples of the inorganic acid include hydrochloric acid, sulfuric acid, nitric acid, and phosphoric acid. Examples of the organic acid include formic acid, acetic acid, propionic acid, lactic acid, oxalic acid, malonic acid, succinic acid, citric acid, tartaric acid, and malic acid.

The used amount of the vinyl monomer having a basic nitrogen atom-containing group is preferably in a range of 0.1 mass % to 15 mass %, and more preferably in a range of 0.5 mass % to 10 mass % with respect to the total amount of the vinyl monomer mixture used in the preparation of the vinyl polymer (A), in terms of further improving the chemical resistance of a film of the aqueous coating agent of the present invention.

Examples of the vinyl monomer having a carboxylic group include (meth)acrylic monomers, such as (meth)acrylic acid, crotonic acid, itaconic acid, maleic acid, and fumaric acid, half-esters thereof, and salts thereof. Among the (meth)acrylic monomers, (meth)acrylic acid is preferable. These vinyl monomers may be used alone or in combination of two or more kinds thereof.

Some or all of the vinyl monomers having a carboxylic group may be previously neutralized by a basic compound. Also, these vinyl monomers may be radical-polymerized to prepare the vinyl polymer (A), and then, if necessary, may be neutralized.

Examples of the basic compound that can be used in the neutralization may include organic amines, such as ammonia, triethylamine, morpholine, monoethanolamine having a boiling point of 100° C. or higher, and diethylethanolamine; and metal hydroxides, such as sodium hydroxide, potassium hydroxide, and lithium hydroxide.

The used amount of the vinyl monomer having a carboxylic group is preferably in a range of 0.1 parts by mass to 10 parts by mass, and more preferably in a range of 0.3 parts by mass to 8 parts by mass with respect to the total amount of the vinyl monomer mixture used in the preparation of the vinyl polymer (A), in terms of further improving the physical properties, such as the adhesiveness of a film of the aqueous coating agent of the present invention to a substrate, warm water resistance, and chemical resistance (alkali resistance).

As the vinyl monomer that can be used in the preparation of the vinyl polymer (A), if necessary, other vinyl monomers can be used in addition to the aforementioned vinyl monomers.

Examples of the above other vinyl monomers include: N-[2-(meth)acryloyloxyethyl] piperidine, N-[2-(meth)acryloyloxyethyl] pyrrolidine, N-[2-(meth)acryloyloxyethyl] morpholine, vinyl monomers having a pyridinyl group, such as 2-vinyl pyridine, and 4-vinyl pyridine; alkyl (meth)acrylates, such as methyl (meth)acrylate, ethyl (meth)acrylate, n-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, n-tetradecyl (meth)acrylate, and cyclohexyl (meth)acrylate; and hydroxyalkyl (meth)acrylates, such as 2-hydroxyethyl (meth)acrylate and 2-hydroxypropyl (meth)acrylate.

Further, examples of the above other vinyl monomers also include vinyl acetate, vinyl propionate, vinyl laurate, styrene, chlorostyrene, chloromethyl styrene, α-methyl styrene, methyl vinyl ether, ethyl vinyl ether, and isobutyl vinyl ether, in addition to glycidyl (meth)acrylate and methyl glycidyl (meth)acrylate.

As the above other vinyl monomers, it is preferable to use methyl (meth)acrylate, ethyl (meth)acrylate, or n-butyl (meth)acrylate in terms of further improving the film performance of the aqueous coating agent of the present invention.

The above other vinyl monomers are preferably used in an amount of 0.5 parts by mass to 97 parts by mass, more preferably used in an amount of 50 parts by mass to 97 parts by mass, and further preferably used in an amount of 80 parts by mass to 95 parts by mass, with respect to 100 parts by mass of the total amount of the vinyl monomer mixture used in the preparation of the vinyl polymer (A), in terms of further improving the film performance of the aqueous coating agent of the present invention.

The polymerization of the vinyl monomer mixture can be performed by collectively or separately supplying each of the vinyl monomer mixture and a polymerization initiator or a mixture thereof into the aqueous medium (C).

Examples of the polymerization initiator that can be used when preparing the vinyl polymer (A) include radical polymerization initiators, such as persulfates, organic peroxides, and hydrogen peroxide; and azo initiators, such as 4,4'-azobis (4-cyano valeric acid) and 2,2'-azobis (2-amidinopropane) dihydrochloride. Meanwhile, the radical polymerization initiator may be used as a redox polymerization initiator in combination with a reductant to be described later.

Examples of the persulfates include potassium persulfate, sodium persulfate, and ammonium persulfate. Specific examples of the organic peroxides may include diacyl peroxides, such as benzoyl peroxide, lauroyl peroxide, and decanoyl peroxide; dialkyl peroxides, such as t-butyl cumyl peroxide and dicumyl peroxide; peroxy esters, such as t-butyl peroxylaurate and t-butyl peroxybenzoate; and hydroperoxides, such as cumene hydroperoxide, paramenthane hydroperoxide, and t-butyl hydroperoxide.

Examples of the reductant that can be used may include ascorbic acid and salts thereof, erythorbic acid and salts thereof, tartaric acid and salts thereof, citric acid and salts thereof, metal salts of formaldehyde sulfoxylate, sodium thiosulfate, sodium bisulfite, and ferric chloride.

Further, at the time of the polymerization, for the purpose of stabilizing the polymerization reaction, it is preferable to use a nonionic emulsifier (D).

Examples of the nonionic emulsifier (D) include polyoxyalkylene alkyl ethers such as polyoxyalkylene branched decyl ethers, polyoxyethylene alkyl ethers, polyoxyethylene alkyl phenyl ethers, polyoxyethylene diphenyl ethers, polyoxyethylene-polyoxypropylene block copolymers, and acetylenediol-based surfactants. Examples of commercially available products of the nonionic emulsifier include "NOIGEN XL-series", "NOIGEN TDS-series", and "NOIGEN TDX-series", manufactured by DKS Co. Ltd.

Among the examples of the nonionic emulsifier (D), in terms of further improving the storage stability and compounding stability of the aqueous coating agent of the present invention, polyoxyalkylene alkyl ethers are preferable, and, more specifically, polyoxyalkylene branched decyl ethers are preferable. Examples of commercially available products of the polyoxyalkylene branched decyl ethers include "NOIGEN XL-series", manufactured by DKS Co. Ltd.

The used amount of the nonionic emulsifier (D) is preferably in a range of 0.1 parts by mass to 10 parts by mass, and more preferably in a range of 0.5 parts by mass to 7.5 parts by mass with respect to 100 parts by mass of the vinyl polymer (A), in terms of further improving the storage stability and compounding stability of the aqueous coating agent of the present invention.

The content ratio of the vinyl polymer (A) in the aqueous coating agent of the present invention is preferably in a range of 3 mass % to 70 mass %.

The aqueous coating agent of the present invention contains a quaternary ammonium salt (B) together with the vinyl polymer (A).

The quaternary ammonium salt (B) is generally used as an emulsifier. However, when the quaternary ammonium salt (B) is combined with the vinyl polymer (A), it is possible to remarkably improve the storage stability and compounding stability of the aqueous coating agent of the present invention without deteriorating the coating properties such as adhesiveness to a substrate.

The quaternary ammonium salt (B) is preferably a compound represented by General Formula (1) below.

[Chem. 1]

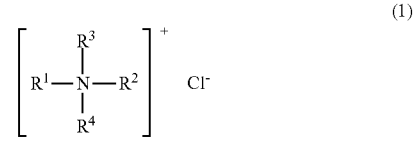

(1)

In General Formula (1), $R^1$ to $R^4$ each independently represent an alkyl group having 1 to 20 carbon atoms or an aryl group.

Among the examples of the compound represented by General Formula (1) above, in terms of further improving the storage stability and compounding stability of the aqueous coating agent of the present invention, a compound represented by the formula in which, $R^1$ is an alkyl group having 10 to 20 carbon atoms, and $R^2$ to $R^4$ each independently represent an alkyl group having 1 to 3 carbon atoms is more preferable.

Examples of commercially available products of the quaternary ammonium salt (B) include "CATIOGEN series" (manufactured by DKS Co. Ltd.), and "QUARTAMIN series" (manufactured by Kao Corporation).

The quaternary ammonium salt (B) is preferably used in a range of 0.1 parts by mass to 10 parts by mass, and is more preferably used in a range of 0.3 parts by mass to 7 parts by mass with respect to 100 parts by mass of the vinyl polymer (A), in terms of further improving the storage stability and compounding stability of the aqueous coating agent of the present invention.

After preparing an aqueous dispersion of the vinyl polymer (A), the quaternary ammonium salt (B) may be mixed with the aqueous dispersion. However, for the purpose of achieving the stabilization of a polymerization reaction of a vinyl monomer mixture used in the preparation of the vinyl polymer (A), the quaternary ammonium salt (B) may also be used during the preparation of the vinyl polymer (A).

Examples of the aqueous medium (C) used in the aqueous coating agent of the present invention include water, organic solvents miscible with water, and mixtures thereof. Examples of the organic solvents miscible with water include: alcohol solvents, such as methanol, ethanol, n-propanol, and isopropanol; ketone solvents, such as acetone and methyl ethyl ketone; polyalkylene glycol solvents, such as ethylene glycol, diethylene glycol, and propylene glycol; alkyl ether solvents of polyalkylene glycol; and lactam solvents, such as N-methyl-2-pyrrolidone. In the present invention, only water may be used, a mixture of water and the organic solvent miscible with water may be used, and only the organic solvent miscible with water may also be used. In terms of safety and environmental load, only water or a mixture of water and the organic solvent miscible with water is preferable, and only water is particularly preferable.

It is preferable that the aqueous medium (C) is contained in the aqueous coating agent of the present invention in a range of 5 mass % to 80 mass %, in terms of suppressing the rapid increase in viscosity at the time of preparing the aqueous coating agent of the present invention and improving the productivity, coating properties and drying properties of the aqueous coating agent.

The aqueous coating agent of the present invention can be prepared by mixing an aqueous dispersion, in which the vinyl polymer (A) is dispersed in the aqueous medium (C), with the quaternary ammonium salt (B) and, if necessary, adding other additives to the mixture.

As the additive, a film-forming aid, a dispersion stabilizer, or a leveling agent may be used. However, in terms of improving the warm water resistance of a film of the aqueous coating agent of the present invention, it is preferable that this additive is used as little as possible. When a film-forming aid, a dispersion stabilizer, or a leveling agent is used, the used amount thereof is preferably 0.5 parts by mass or less with respect to 100 parts by mass of solid content in the aqueous coating agent of the present invention.

Examples of the film-forming aid include N-methyl pyrrolidone, butyl carbitol acetate, dibutyl diglycol, methyl cellosolve, and butyl cellosolve. When these film-forming aids are used, preferably, they are used within a range not to impair the effects of the present invention.

The aqueous coating agent of the present invention can be used in the coating of various articles for the purpose of surface protection of various articles and design-imparting thereto.

The article of the present invention refers to an article having a film of the aqueous coating agent of the present invention. Examples of the material of the article include various plastics, metals, glass, paper, and wood. In particular, when the aqueous coating agent of the present invention is used in various plastic substrates, a film having excellent warm water resistance, corrosion resistance, and chemical resistance and having excellent adhesiveness to a plastic substrate can be obtained even when the film is formed in a drying process at relatively low temperature.

Examples of the plastic-made articles capable of using the aqueous coating agent of the present invention include molded products, which is made of plastics, such as an acrylonitrile-butadiene-styrene resin (ABS resin), a polycarbonate resin (PC resin), an ABS/PC resin, a polystyrene resin (PS resin), a polymethyl methacrylate resin (PMMA resin), an acrylic resin, a polypropylene resin, and a polyethylene resin. Further, specific examples of the articles include mobile phones, home electric appliances, OA equipment, and automobile interior and exterior materials.

Further, the aqueous coating agent of the present invention can also be used for various film substrates. Examples of the film substrates include a polyethylene terephthalate film, a polyester film, a polyethylene film, a polypropylene film, a triacetyl cellulose (TAC) film, a polycarbonate film, and a polyvinyl chloride film.

Moreover, the aqueous coating agent of the present invention can also be suitably used for a metal substrate because it can forma densely-formed crosslinked film capable of suppressing the corrosion of the metal substrate. Examples of the metal substrate include a zinc-plated steel sheet, a plated steel sheet of an aluminum-zinc alloy steel sheet, an aluminum sheet, an aluminum alloy sheet, an electromagnetic steel sheet, a copper sheet, and a stainless steel sheet, which are used for automobiles, home electric appliances, building materials, and the like. Examples of specific articles using the metal substrate include building members, such as outer walls and roofs, civil engineering members, such as guardrails, soundproof walls, and drain ditches, home electric appliances, industrial machines, and automobile exterior materials.

When the aqueous coating agent of the present invention is used, it is possible to obtain a film having very excellent corrosion resistance and excellent chemical resistance, such as acid resistance or alkali resistance, even though the thickness of the film is about 1 µm. Therefore, this aqueous coating agent is extremely useful as a coating agent (metal surface treating agent) of the metal substrate because the prevention of corrosion of the metal substrate and the improvement of chemical resistance thereof are realized when the aqueous coating agent of the present invention is used for the metal substrate.

The aqueous coating agent of the present invention is applied onto a substrate, dried, and cured, thereby forming a film. Examples of the method of applying the aqueous coating agent of the present invention onto the substrate include spraying, curtain coating, flow coating, roll coating, brushing, and dipping.

As to drying conditions at the time of forming a film using the aqueous coating agent of the present invention, natural drying may be performed at room temperature, but heat drying can also be performed. In the case of heat drying, generally, it is preferable to perform the heat drying at a temperature range of 40° C. to 250° C. for about 1 to 600 seconds.

Meanwhile, when the substrate is a substrate, such as a plastic substrate, which is easily deformed by heat, it is preferable that the aforementioned drying temperature is 80° C. or lower. Even when the aqueous coating agent of the present invention is dried at a temperature of 80° C. or lower for a short time of about several seconds, the crosslinking reaction of a film proceeds at low temperature (room temperature) after heat drying, so as to obtain a film having excellent warm water resistance, corrosion resistance, and chemical resistance.

EXAMPLES

Hereinafter, the present invention will be described in detail with reference to Examples and Comparative Examples.

Example 1

49 parts by mass of n-butyl acrylate, 48 parts by mass of methyl methacrylate, 2 parts by mass of dimethylaminoethyl methacrylate, and 1 part by mass of methacrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-1).

110 parts by mass of deionized water and 4.0 parts by mass of CATIOGEN TML (aqueous solution of 30 mass % of alkyl trimethyl ammonium chloride, manufactured by DKS Co. Ltd.) were supplied to another reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of the monomer pre-emulsion (X-1) was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (1) including an aqueous dispersion of a vinyl polymer.

Example 2

46.3 parts by mass of n-butyl acrylate, 48 parts by mass of methyl methacrylate, 4 parts by mass of dimethylaminoethyl methacrylate, and 1.7 parts by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-2). Subsequent operations were carried out in the same manner as in Example 1, so as to obtain an aqueous coating agent (2) including an aqueous dispersion of a vinyl polymer.

Example 3

45 parts by mass of n-butyl acrylate, 44 parts by mass of methyl methacrylate, 9 parts by mass of dimethylaminoethyl methacrylate, and 2 parts by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-3). Subsequent operations were carried out in the same manner as in Example 1, so as to obtain an aqueous coating agent (3) including an aqueous dispersion of a vinyl polymer.

Example 4

43 parts by mass of n-butyl acrylate, 42 parts by mass of methyl methacrylate, 8 parts by mass of dimethylaminoethyl methacrylate, and 7 parts by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-4). Subsequent operations were carried out in the same manner as in Example 1, so as to obtain an aqueous coating agent (4) including an aqueous dispersion of a vinyl polymer.

Example 5

48 parts by mass of n-butyl acrylate, 47 parts by mass of methyl methacrylate, 2 parts by mass of dimethylaminoethyl methacrylate, and 3 parts by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-5). Subsequent operations were carried out in the same manner as in Example 1, so as to obtain an aqueous coating agent (5) including an aqueous dispersion of a vinyl polymer.

Example 6

48 parts by mass of n-butyl acrylate, 49 parts by mass of methyl methacrylate, 1.5 parts by mass of dimethylaminoethyl methacrylate, and 1.5 parts by mass of methacrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-6). Subsequent operations were carried out in the same manner as in Example 1, so as to obtain an aqueous coating agent (6) including an aqueous dispersion of a vinyl polymer.

Example 7

48 parts by mass of n-butyl acrylate, 48 parts by mass of methyl methacrylate, 3 parts by mass of dimethylaminoethyl methacrylate, and 1 part by mass of methacrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-7). Subsequent operations were carried out in the same manner as in Example 1, so as to obtain an aqueous coating agent (7) including an aqueous dispersion of a vinyl polymer.

Example 8

47 parts by mass of n-butyl acrylate, 46 parts by mass of methyl methacrylate, 6 parts by mass of dimethylaminoethyl methacrylate, and 1 part by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-8). Subsequent operations were carried out in the same manner as in Example 1, so as to obtain an aqueous coating agent (8) including an aqueous dispersion of a vinyl polymer.

Example 9

110 parts by mass of deionized water and 20 parts by mass of CATIOGEN TML (aqueous solution of 30 mass % of alkyl trimethyl ammonium chloride, manufactured by DKS Co. Ltd.) were supplied to a reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of 135 parts by mass of the monomer pre-emulsion (X-1) obtained in the same manner as in Example 1 was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (9) including an aqueous dispersion of a vinyl polymer.

Example 10

110 parts by mass of deionized water and 8 parts by mass of CATIOGEN TMS (aqueous solution of 25 mass % of alkyl trimethyl ammonium chloride, manufactured by DKS Co. Ltd.) were supplied to a reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of 135 parts by mass of the monomer pre-emulsion (X-1) obtained in the same manner as in Example 1 was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (10) including an aqueous dispersion of a vinyl polymer.

Example 11

110 parts by mass of deionized water and 4 parts by mass of CATIOGEN BC-50 (aqueous solution of 50 mass % of alkyl dimethyl benzyl ammonium chloride, manufactured by DKS Co. Ltd.) were supplied to a reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of 135 parts by mass of the monomer pre-emulsion (X-1) obtained in the same manner as in Example 1 was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (11) including an aqueous dispersion of a vinyl polymer.

Example 12

110 parts by mass of deionized water and 4 parts by mass of CATIOGEN ES-L (aqueous solution of 50 mass % of alkyl dimethyl ethyl ammonium ethyl sulfate, manufactured by DKS Co. Ltd.) were supplied to a reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of 135 parts by mass of the monomer pre-emulsion (X-1) obtained in the same manner as in Example 1 was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (12) including an aqueous dispersion of a vinyl polymer.

Example 13

49 parts by mass of n-butyl acrylate, 48 parts by mass of methyl methacrylate, 2 parts by mass of dimethylaminoethyl methacrylate, and 1 part by mass of methacrylic acid were sequentially supplied into a container charged with 30 parts by mass of deionized water and 6.7 parts by mass of CATIOGEN TML (aqueous solution of 30 mass % of alkyl trimethyl ammonium chloride, manufactured by DKS Co. Ltd.), followed by stirring, so as to prepare 136.7 parts by mass of a monomer pre-emulsion (X-9).

110 parts by mass of deionized water and 20 parts by mass of CATIOGEN TML (aqueous solution of 30 mass % of alkyl trimethyl ammonium chloride, manufactured by DKS Co. Ltd.) were supplied to another reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.5 parts by mass) of the monomer pre-emulsion (X-9) was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-9) was added dropwise over 180 minutes. After the monomer pre-emulsion (X-9) was added dropwise, cooling was performed to obtain an aqueous coating agent (13) including an aqueous dispersion of a vinyl polymer.

Comparative Example 1

49 parts by mass of n-butyl acrylate, 48 parts by mass of methyl methacrylate, 2 parts by mass of dimethylaminoethyl methacrylate, and 1 part by mass of methacrylic acid were sequentially supplied into a container charged with 30 parts by mass of deionized water and 6.5 parts by mass of NOIGEN XL-400 (polyoxyalkylene branched decyl ether, manufactured by DKS Co. Ltd.), followed by stirring, so as to prepare 136.5 parts by mass of a monomer pre-emulsion (X-10).

110 parts by mass of deionized water was supplied to another reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.5 parts by mass) of the monomer pre-emulsion (X-10) was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-10) was added dropwise over 180 minutes. After monomer pre-emulsion (X-10) was added dropwise, cooling was performed to obtain an aqueous coating agent (R1) including an aqueous dispersion of a vinyl polymer.

Comparative Example 2

48 parts by mass of n-butyl acrylate, 48 parts by mass of methyl methacrylate, and 4 parts by mass of dimethylaminoethyl methacrylate were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-11).

110 parts by mass of deionized water and 4.0 parts by mass of CATIOGEN TML (aqueous solution of 30 mass % of alkyl trimethyl ammonium chloride, manufactured by DKS Co. Ltd.) were supplied to another reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of the monomer pre-emulsion (X-11) was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-11) was added dropwise over 180 minutes. After the monomer pre-emulsion (X-11) was added dropwise, cooling was performed to obtain an aqueous coating agent (R2) including an aqueous dispersion of a vinyl polymer.

Comparative Example 3

50 parts by mass of n-butyl acrylate, 48 parts by mass of methyl methacrylate, and 2 parts by mass of acrylic acid were sequentially supplied into a container charged with 30 parts by mass of deionized water and 5 parts by mass of NOIGEN XL-400 (polyoxyalkylene branched decyl ether, manufactured by DKS Co. Ltd.), followed by stirring, so as to prepare 135 parts by mass of a monomer pre-emulsion (X-12).

110 parts by mass of deionized water and 4.0 parts by mass of CATIOGEN TML (aqueous solution of 30 mass % of alkyl trimethyl ammonium chlorde, manufactured by DKS Co. Ltd.) were supplied to another reaction container provided with a stirrer, a reflux cooling tube, a nitrogen inlet tube, a thermometer, and a dropping funnel, and the temperature of the reaction container was adjusted to 70° C. while blowing nitrogen gas. Subsequently, a solution in which 0.04 parts by mass of 2',2-azobis(2-amidinopropane) was diluted with 2 parts by mass of deionized water was supplied to the reaction container with stirring, and then a part (5.4 parts by mass) of the monomer pre-emulsion (X-12) was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-12) was added dropwise over 180 minutes. After the monomer pre-emulsion (X-12) was added dropwise, cooling was performed to obtain an aqueous coating agent (R3) including an aqueous dispersion of a vinyl polymer.

Comparative Example 4

110 parts by mass of deionized water and 2 parts by mass of ACETAMIN 24 (alkylamine salt, manufactured by Kao Corporation) were supplied to a reaction container provided with a stirrer, a reflux cooling tube, a nitrogen inlet tube, a thermometer, and a dropping funnel, and the temperature of the reaction container was adjusted to 70° C. while blowing nitrogen gas. A solution in which 0.04 parts by mass of 2',2-azobis(2-amidinopropane) was diluted with 2 parts by mass of deionized water was supplied to the reaction container with stirring, and then a part (5.4 parts by mass) of 135 parts by mass of the monomer pre-emulsion (X-1) obtained in the same manner as in Example 1 was supplied thereto, so as to perform a reaction for 45 minutes while maintaining the temperature of the reaction container at 70±2° C.

Then, a solution in which 0.12 parts by mass of 2',2-azobis(2-amidinopropane) was diluted with 6 parts by mass of deionized water was added dropwise into the reaction container over 240 minutes while maintaining the temperature of the reaction container at 70±2° C., and simultaneously the remaining monomer pre-emulsion (X-1) was added dropwise over 180 minutes. After the monomer pre-emulsion (X-1) was added dropwise, cooling was performed to obtain an aqueous coating agent (R4) including an aqueous dispersion of a vinyl polymer.

The following evaluations were performed using the aqueous coating agents (1) to (13) and (R1) to (R4) obtained in the above Examples 1 to 13 and Comparative Examples 1 to 4.

[Evaluation of Warm Water Resistance]

Each of the aqueous coating agents obtained in Examples and Comparative Examples was applied onto an aluminum (55 mass %)-zinc-based alloy plated steel sheet defatted with acetone using a bar coater such that the film thickness after drying is about 5 μm, and then dried at an ambient temperature of 100° C. for 60 seconds using a dryer, so as to form a film. Thereafter, the film was aged at room temperature for 3 days to make a test piece. The test piece was dipped into warm water of 50° C. After 100 minutes, the deteriorated state of the film was visually observed, and warm water resistance was evaluated based on the following criteria.

A: The film was not changed at all.
B: Although it was observed that a part of the surface of the film was slightly discolored, it was a level which causes no problem practically.
C: It was observed that the entire film was swollen.
D: The film was stripped, and thus the substrate was exposed.

[Evaluation of Chemical Resistance (Acid Resistance)]

Each of the aqueous coating agents obtained in Examples and Comparative Examples was applied onto an aluminum (55 mass %)-zinc-based alloy plated steel sheet defatted with acetone using a bar coater such that the film thickness after drying is about 5 μm, and then dried at an ambient temperature of 100° C. for 60 seconds using a dryer, so as to form a film. Thereafter the film was aged at room temperature for 3 days to make a test piece. 1N hydrochloric acid was spot-placed onto the film constituting the test piece. After the film was left for 100 minutes, the deteriorated state of the film was visually observed, and chemical resistance (acid resistance) was evaluated based on the following criteria.

A: The surface of the film was not changed at all.
B: Although it was observed that the surface of the film was slightly yellowed, it was a level which causes no problem practically.
C: The surface of the film was significantly discolored.
D: The film was dissolved, and thus the substrate was exposed.

[Evaluation of Chemical Resistance (Alkali Resistance)]

Each of the aqueous coating agents obtained in Examples and Comparative Examples was applied onto an aluminum (55 mass %)-zinc-based alloy plated steel sheet defatted with acetone using a bar coater such that the film thickness after drying is about 5 μm, and then dried at an ambient temperature of 100° C. for 60 seconds using a dryer, so as to form a film. Thereafter the film was aged at room temperature for 3 days to make a test piece. A 5 mass % aqueous sodium hydroxide solution was spot-placed onto the film constituting the test piece. After the film was left for 60 minutes, the deteriorated state of the film was visually observed, and chemical resistance (alkali resistance) was evaluated based on the following criteria.

A: The surface of the film was not changed at all.
B: Although it was observed that a part of the surface of the film was slightly discolored, it was a level which causes no problem practically.
C: It was observed that the surface of the film was discolored.
D: The film was dissolved, and thus the substrate was exposed.

[Evaluation of Adhesiveness (Primary Adhesiveness) to Plastic Substrate]

Each of the aqueous coating agents obtained in Examples and Comparative Examples was applied onto the following four kinds of plastic substrates using an applicator of 3 mil (0.0762 mm), dried at 60° C. for 30 minutes, and then aged at 25° C. for 2 days, so as to form a film. Cellophane tape (registered trademark) stripping tests of 100 grids of 1 square millimeter (1 mm$^2$) were carried out on the surface of the obtained film based on JIS K-5400. The number of grids unstripped was measured, and adhesiveness (primary adhesiveness) to the plastic substrate was evaluated based on the following criteria.

(Plastic Substrates Used)
Substrate made of an acrylonitrile-butadiene-styrene resin (ABS resin) (hereinafter, abbreviated as "ABS".)
Substrate made of a polycarbonate resin (PC resin) (hereinafter, abbreviated as "PC".)
Substrate made of a polymer alloy (ABS/PC resin) of an acrylonitrile-butadiene-styrene resin and a polycarbonate resin (hereinafter, abbreviated as "ABS/PC".)

Substrate made of a polymethylmethacrylate resin (PMMA resin) (hereinafter, abbreviated as "PMMA".)

A: The number of grids unstripped was 90 or more.
B: The number of grids unstripped was 60 or more and less than 90.
C: The number of grids unstripped was 40 or more and less than 60.
D: The number of grids unstripped was less than 40.

[Evaluation of Adhesiveness (Warm Water Adhesiveness) to Plastic Substrate]

A film was prepared in the same manner as in the aforementioned evaluation of adhesiveness (primary adhesiveness) to be used as a test piece. The test piece was dipped into warm water of 50° C. for 100 minutes and then taken out, water was wiped off from the surface of the test piece, and then stripping tests were carried out in the same manner as in the aforementioned evaluation of adhesiveness (primary adhesiveness). Adhesiveness (warm water adhesiveness) to the plastic substrate was evaluated based on the above criteria.

[Evaluation of Corrosion Resistance]

Each of the aqueous coating agents obtained in Examples and Comparative Examples was applied onto an aluminum (55 mass %)-zinc-based alloy plated steel sheet defatted with acetone using a bar coater such that the film thickness after drying is about 5 μm, and then dried at an ambient temperature of 100° C. for 60 seconds using a dryer, so as to form a film. Thereafter the film was aged at room temperature for 3 days to make a test piece.

The surface of the film of the prepared test piece was scratched with a cutter knife (cross-cut portion) to a depth reaching the substrate, and a salt spray test was carried out using a salt spray tester manufactured by Suga Test Instruments Co., Ltd. The rust occurrence area after 240 hours was visually determined, and corrosion resistance was evaluated based on the following criteria. Here, the evaluation of corrosion resistance was separately performed with respect to the planar portion not scratched by the cutter knife and the periphery of the cross-cut portion scratched by the cutter knife.

<Planar Portion>

A: The area where rust formation and the occurrence of the swelling or stripping of the film due to rust were observed was less than 5% with respect to the entire planar portion.
B: The area where rust formation and the occurrence of the swelling or stripping of the film due to rust were observed was 5% or more and less than 30% with respect to the entire planar portion.
C: The area where rust formation and the occurrence of the swelling or stripping of the film due to rust were observed was 30% or more and less than 60% with respect to the entire planar portion.
D: The area where rust formation and the occurrence of the swelling or stripping of the film due to rust were observed was 60% or more with respect to the entire planar portion.

<Periphery of Cross-Cut Portion>

A: The formation of rust at the periphery of the cross-cut portion was not observed, and the stripping of the film or the like due to rust was not observed.
B: The formation of rust at the periphery of the cross-cut portion was slightly observed, but the stripping or swelling of the film caused thereby was not observed.
C: The formation of rust at the periphery of the cross-cut portion was widely observed, and the stripping or swelling of the film caused thereby was not observed.
D: The formation of rust at the periphery of the cross-cut portion was widely observed, the stripping or swelling of the film caused thereby was observed, and the contamination of the film due to flowing of the rust was observed.

[Evaluation of Storage Stability]

80 mL of each of the aqueous coating agents obtained in Examples and Comparative Examples was put into a 100 mL glass bottle, and was stored in a dryer at an ambient temperature of 40° C. The appearances of the aqueous coating agent after storing for 1 week and after storing for 1 month were visually observed, and storage stability was evaluated based on the following criteria.

A: Aggregates and precipitates were not observed at the bottom of the glass bottle.
B: Aggregates and precipitates were observed at a level of 0% to 10% of the bottom of the glass bottle.
C: Aggregates and precipitates were observed at a level of 10% to 50% of the bottom of the glass bottle.
D: Aggregates and precipitates were observed at a level of 50% to 100% of the bottom of the glass bottle.

[Evaluation of Compounding Stability to Acidic Aqueous Solution]

30 mL of each of the aqueous coating agents obtained in Examples and Comparative Examples was put into a 100 mL glass bottle, and 3 mL of a citric acid-phosphate buffer solution (pH=3.4) obtained by mixing 39.5 mL of 0.1 M citric acid with 14.1 mL of a 0.2 M disodium hydrogen phosphate solution was added thereto, and then the mixture was uniformly mixed, so as to obtain a mixed solution. The appearance of the obtained mixed solution was visually observed, and compounding stability to an acidic aqueous solution was evaluated based on the following criteria.

A: Aggregates and precipitates were not observed at the bottom of the glass bottle.
B: Aggregates and precipitates were observed at a level of 0% to 10% of the bottom of the glass bottle.
C: Aggregates and precipitates were observed at a level of 10% to 50% of the bottom of the glass bottle.
D: Aggregates and precipitates were observed at a level of 50% to 100% of the bottom of the glass bottle.

[Evaluation of Compounding Stability to Alkaline Aqueous Solution]

30 mL of each of the aqueous coating agents obtained in Examples and Comparative Examples was put into a 100 mL glass bottle, and 3 mL of a phosphate buffer solution (pH=8.0) obtained by mixing 5.3 mL of a 0.2 M sodium dihydrogen phosphate solution with 94.7 mL of a 0.2 M disodium hydrogen phosphate solution was added thereto, and then the mixture was uniformly mixed, so as to obtain a mixed solution. The appearance of the obtained mixed solution was visually observed, and compounding stability to an alkaline aqueous solution was evaluated based on the above criteria.

The compositions and evaluation results of the aqueous coating agents obtained in Examples and Comparative Examples are shown in Tables 1 to 3.

TABLE 1

| | | | Example 1 | Example 2 | Example 3 | Example 4 | Example 5 | Example 6 | Example 7 |
|---|---|---|---|---|---|---|---|---|---|
| Aqueous coating agent | | | (1) | (2) | (3) | (4) | (5) | (6) | (7) |
| Composition | Monomer composition of vinyl polymer (parts by mass) | BA | 49 | 46.3 | 45 | 43 | 48 | 48 | 48 |
| | | MMA | 48 | 48 | 44 | 42 | 47 | 49 | 48 |
| | | DM | 2 | 4 | 9 | 8 | 2 | 1.5 | 3 |
| | | MAA | 1 | | | | | 1.5 | 1 |
| | | AA | | 1.7 | 2 | 7 | 3 | | |
| | | Total | 100 | 100 | 100 | 100 | 100 | 100 | 100 |
| | Content of basic nitrogen-containing group in vinyl polymer (mmol/kg) | | 127 | 254 | 572 | 509 | 127 | 95 | 191 |
| | Content of carboxylic group in vinyl polymer (mmol/kg) | | 116 | 236 | 278 | 971 | 416 | 174 | 116 |
| | Molar ratio of basic nitrogen-containing group to carboxylic group in vinyl polymer | | 1.1 | 1.1 | 2.1 | 0.5 | 0.3 | 0.5 | 1.6 |
| | Quaternary ammonium salt | Kind | TML | TML | TML | TML | TML | TML | TML |
| | | Content*[1] (parts by mass) | 1.2 | 1.2 | 1.2 | 1.2 | 1.2 | 1.2 | 1.2 |
| | Nonionic emulsifier | Kind | XL-400 | XL-400 | XL-400 | XL-400 | XL-400 | XL-400 | XL-400 |
| | | Content*[1] (parts by mass) | 5 | 5 | 5 | 5 | 5 | 5 | 5 |
| Evaluation results | Warm water resistance | | A | A | A | A | A | A | A |
| | Chemical resistance (acid resistance) | | A | A | B | A | A | A | B |
| | Chemical resistance (alkali resistance) | | A | A | A | B | B | B | A |
| | Adhesiveness to plastic substrate (primary adhesiveness) | ABS | A | A | A | A | A | A | A |
| | | PC | A | A | A | A | A | A | A |
| | | ABS/PC | A | A | A | A | A | A | B |
| | | PMMA | A | A | A | A | A | A | A |
| | Adhesiveness to plastic substrate (warm water adhesiveness) | ABS | A | A | A | A | A | A | A |
| | | PC | A | A | A | A | B | B | A |
| | | ABS/PC | A | A | A | A | A | A | B |
| | | PMMA | A | A | A | A | A | A | A |
| | Corrosion resistance | Planar portion | A | A | A | A | B | A | A |
| | | Periphery of cross-cut portion | A | A | A | A | A | A | A |
| | Storage stability | After 1 week | A | A | A | A | A | A | A |
| | | After 1 month | A | A | B | B | A | A | A |
| | Compounding stability | Acidic aqueous solution | A | A | B | A | A | A | A |
| | | Alkaline aqueous solution | A | A | A | B | B | A | A |

*[1]content with respect to 100 parts by mass of vinyl polymer

TABLE 2

| | | | Example 8 | Example 9 | Example 10 | Example 11 | Example 12 | Example 13 |
|---|---|---|---|---|---|---|---|---|
| Aqueous coating agent | | | (8) | (9) | (10) | (11) | (12) | (13) |
| Composition | Monomer composition of vinyl polymer (parts by mass) | BA | 47 | 49 | 49 | 49 | 49 | 49 |
| | | MMA | 46 | 48 | 48 | 48 | 48 | 48 |
| | | DM | 6 | 2 | 2 | 2 | 2 | 2 |
| | | MAA | | 1 | 1 | 1 | 1 | 1 |
| | | AA | 1 | | | | | |
| | | Total | 100 | 100 | 100 | 100 | 100 | 100 |
| | Content of basic nitrogen-containing group in vinyl polymer (mmol/kg) | | 382 | 127 | 127 | 127 | 127 | 127 |
| | Content of carboxylic group in vinyl polymer (mmol/kg) | | 139 | 116 | 116 | 116 | 116 | 116 |

TABLE 2-continued

|  |  |  | Example 8 | Example 9 | Example 10 | Example 11 | Example 12 | Example 13 |
|---|---|---|---|---|---|---|---|---|
|  |  | Molar ratio of basic nitrogen-containing group to carboxylic group in vinyl polymer | 2.7 | 1.1 | 1.1 | 1.1 | 1.1 | 1.1 |
|  | Quaternary ammonium salt | Kind | TML | TML | TMS | BC-50 | ES-L | TML |
|  |  | Content*1 (parts by mass) | 1.2 | 6 | 2 | 2 | 2 | 8 |
|  | Nonionic emulsifier | Kind | XL-400 | XL-400 | XL-400 | XL-400 | XL-400 |  |
|  |  | Content*1 (parts by mass) | 5 | 5 | 5 | 5 | 5 |  |
| Evaluation results | Warm water resistance |  | A | B | A | A | A | B |
|  | Chemical resistance (acid resistance) |  | B | A | A | B | A | B |
|  | Chemical resistance (alkali resistance) |  | A | A | A | A | B | B |
|  | Adhesiveness to plastic substrate (primary adhesiveness) | ABS | A | A | A | A | A | B |
|  |  | PC | A | B | B | B | A | B |
|  |  | ABS/PC | B | A | A | A | A | B |
|  |  | PMMA | A | B | A | A | B | B |
|  | Adhesiveness to plastic substrate (warm water adhesiveness) | ABS | A | B | A | A | A | B |
|  |  | PC | A | B | A | A | A | A |
|  |  | ABS/PC | B | B | B | A | A | B |
|  |  | PMMA | A | B | A | A | A | A |
|  | Corrosion resistance | Planar portion | A | A | A | A | A | B |
|  |  | Periphery of cross-cut portion | A | B | A | A | A | B |
|  | Storage stability | After 1 week | A | A | A | A | A | B |
|  |  | After 1 month | B | A | A | B | B | B |
|  | Compounding stability | Acidic aqueous solution | B | A | A | A | A | B |
|  |  | Alkaline aqueous solution | A | A | A | B | A | B |

*1content with respect to 100 parts by mass of vinyl polymer

TABLE 3

|  |  |  | Comparative Example 1 | Comparative Example 2 | Comparative Example 3 | Comparative Example 4 |
|---|---|---|---|---|---|---|
| Aqueous coating agent |  |  | (R1) | (R2) | (R3) | (R4) |
| Composition | Monomer composition of vinyl polymer (parts by mass) | BA | 49 | 48 | 50 | 49 |
|  |  | MMA | 48 | 48 | 48 | 48 |
|  |  | DM | 2 | 4 | 0 | 2 |
|  |  | MAA | 1 |  |  | 1 |
|  |  | AA |  |  | 2 |  |
|  |  | Total | 100 | 100 | 100 | 100 |
|  | Content of basic nitrogen-containing group in vinyl polymer (mmol/kg) |  | 127 | 254 | 0 | 127 |
|  | Content of carboxylic group in vinyl polymer (mmol/kg) |  | 116 | 0 | 278 | 116 |
|  | Molar ratio of basic nitrogen-containing group to carboxylic group in vinyl polymer |  | 1.1 | — | — | 1.1 |
|  | Quaternary ammonium salt | Kind |  | TML | TML |  |
|  |  | Content*1 (parts by mass) |  | 1.2 | 1.2 |  |
|  | Cationic emulsifier | Kind |  |  |  | ACETAMIN |
|  |  | Content*1 (parts by mass) |  |  |  | 2 |

TABLE 3-continued

|  |  | Comparative Example 1 | Comparative Example 2 | Comparative Example 3 | Comparative Example 4 |
|---|---|---|---|---|---|
|  | Nonionic emulsifier | Kind | XL-400 | XL-400 | XL-400 | XL-400 |
|  |  | Content*1 (parts by mass) | 6.5 | 5 | 5 | 5 |
| Evaluation results | Warm water resistance |  | D | C | C | D |
|  | Chemical resistance (acid resistance) |  | C | D | D | C |
|  | Chemical resistance (alkali resistance) |  | C | D | D | C |
|  | Adhesiveness to plastic substrate (primary adhesiveness) | ABS | C | D | B | C |
|  |  | PC | C | C | B | C |
|  |  | ABS/PC | C | D | B | C |
|  |  | PMMA | C | C | B | C |
|  | Adhesiveness to plastic substrate (warm water adhesiveness) | ABS | B | D | C | B |
|  |  | PC | C | C | C | B |
|  |  | ABS/PC | B | C | D | B |
|  |  | PMMA | B | D | C | B |
|  | Corrosion resistance | Planar portion | C | D | D | C |
|  |  | Periphery of cross-cut portion | C | D | D | C |
|  | Storage stability | After 1 week | B | C | C | B |
|  |  | After 1 month | C | D | D | C |
|  | Compounding stability | Acidic aqueous solution | C | B | D | C |
|  |  | Alkaline aqueous solution | B | D | C | B |

*1 content with respect to 100 parts by mass of vinyl polymer

Abbreviations in Tables 1 to 3 are as follows.
BA: n-butyl acrylate
MMA: methyl methacrylate
DM: N,N-dimethylaminoethyl methacrylate
MAA: methacrylic acid
AA: acrylic acid
TML: CATIOGEN TML (aqueous solution of 30 mass % of alkyl trimethyl ammonium chloride, manufactured by DKS Co. Ltd.)
BC-50: CATIOGEN BC-50 (aqueous solution of 50 mass % of alkyl dimethyl benzyl ammonium chloride, manufactured by DKS Co. Ltd.)
ES-L: CATIOGEN ES-L (aqueous solution of 50 mass % of alkyl dimethyl ethyl ammonium ethyl sulfate, manufactured by DKS Co. Ltd.)
ACETAMIN: ACETAMIN 24 (alkylamine salt, manufactured by Kao Corporation)
XL-400: NOIGEN XL-400 (polyoxyalkylene branched decyl ether, manufactured by DKS Co. Ltd.)

From the evaluation results shown in Tables 1 and 2, it was found that the aqueous coating agent of the present invention is excellent in adhesiveness, warm water resistance, corrosion resistance, and chemical resistance, can form a film capable of preventing the deterioration of various substrates, and is excellent in storage stability and compounding stability.

Meanwhile, Comparative Example 1 is an example of aqueous coating agents containing no quaternary ammonium salt (B). It was found that the film of the aqueous coating agent of Comparative Example 1 is very poor in warm water resistance and is insufficient in chemical resistance (acid resistance and alkali resistance), corrosion resistance, and warm water adhesiveness to a polycarbonate substrate. Further, it was found that the aqueous coating agent of Comparative Example 1 is insufficient in storage stability after 1 month and compounding stability to an acidic aqueous solution.

Comparative Example 2 is an example of aqueous coating agents using a vinyl polymer having no basic nitrogen atom-containing group. It was found that the film of the aqueous coating agent of Comparative Example 2 is very poor in chemical resistance (acid resistance and alkali resistance), adhesiveness to an ABS resin substrate, corrosion resistance, and the like, and is insufficient in warm water resistance. Further, it was found that the aqueous coating agent of Comparative Example 2 is very poor in storage stability after 1 month and compounding stability to an alkaline aqueous solution.

Comparative Example 3 is an example of aqueous coating agents using a vinyl polymer having no carboxylic group. It was found that the film of the aqueous coating agent of Comparative Example 3 is very poor in chemical resistance (acid resistance and alkali resistance), corrosion resistance, and the like, and is insufficient in warm water adhesiveness to a plastic substrate. Further, it was found that the aqueous coating agent of Comparative Example 3 is very poor in storage stability after 1 month and compounding stability to an acidic aqueous solution.

Comparative Example 4 is an example of aqueous coating agents using a cationic emulsifier instead of a quaternary ammonium salt. It was found that the film of the aqueous coating agent of Comparative Example 4 is very poor in warm water resistance and the like, and is insufficient in chemical resistance (acid resistance and alkali resistance), primary adhesiveness to a plastic substrate, and corrosion resistance. Further, it was found that the aqueous coating agent of Comparative Example 4 is insufficient in storage stability after 1 month and compounding stability to an acidic aqueous solution.

The invention claimed is:

1. An aqueous coating agent comprising:
a vinyl polymer (A) having a basic nitrogen atom-containing group, which is at least one selected from an N,N-dimethylaminoethyl group, an N,N-dimethylaminopropyl group and an N,N-diethylaminopropyl group, and a carboxylic group;
a quaternary ammonium salt (B) represented by General Formula (1) below;
an aqueous medium (C); and
a nonionic emulsifier (D),
wherein the nonionic emulsifier (D) is a polyoxyalkylene branched decyl ether:

[Chem. 1]

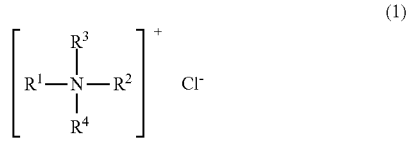

(1)

wherein, in General Formula (1), $R^1$ to $R^4$ each independently represent an alkyl group having 1 to 20 carbon atoms or an aryl group.

2. The aqueous coating agent according to claim 1, wherein the quaternary ammonium salt (B) is included in an amount of 0.1 parts by mass to 10 parts by mass with respect to 100 parts by mass of the vinyl polymer (A).

3. The aqueous coating agent according to claim 1, wherein the vinyl polymer (A) has 30 mmol/kg to 700 mmol/kg of a basic nitrogen atom-containing group, and has 50 mmol/kg to 1,200 mmol/kg of a carboxylic group.

4. The aqueous coating agent according to claim 1, wherein the molar ratio of the basic nitrogen atom-containing group to the carboxylic group [basic nitrogen atom-containing group/carboxylic group] in the vinyl polymer (A) is in a range of 0.1 to 3.

5. The aqueous coating agent according to claim 1, wherein the nonionic emulsifier (D) is included in an amount of 0.1 parts by mass to 10 parts by mass with respect to 100 parts by mass of the vinyl polymer (A).

6. An article comprising a film of the aqueous coating agent according to claim 1.

7. A metal article comprising a film of the aqueous coating agent according to claim 1.

8. The aqueous coating agent according to claim 2, wherein the vinyl polymer (A) has 30 mmol/kg to 700 mmol/kg of a basic nitrogen atom-containing group, and has 50 mmol/kg to 1,200 mmol/kg of a carboxylic group.

9. The aqueous coating agent according to claim 2, wherein the molar ratio of the basic nitrogen atom-containing group to the carboxylic group [basic nitrogen atom-containing group/carboxylic group] in the vinyl polymer (A) is in a range of 0.1 to 3.

10. The aqueous coating agent according to claim 3, wherein the molar ratio of the basic nitrogen atom-containing group to the carboxylic group [basic nitrogen atom-containing group/carboxylic group] in the vinyl polymer (A) is in a range of 0.1 to 3.

11. The aqueous coating agent according to claim 2, wherein the nonionic emulsifier (D) is included in an amount of 0.1 parts by mass to 10 parts by mass with respect to 100 parts by mass of the vinyl polymer (A).

12. The aqueous coating agent according to claim 3, wherein the nonionic emulsifier (D) is included in an amount of 0.1 parts by mass to 10 parts by mass with respect to 100 parts by mass of the vinyl polymer (A).

13. The aqueous coating agent according to claim 4, wherein the nonionic emulsifier (D) is included in an amount of 0.1 parts by mass to 10 parts by mass with respect to 100 parts by mass of the vinyl polymer (A).

14. An article comprising a film of the aqueous coating agent according to claim 2.

15. An article comprising a film of the aqueous coating agent according to claim 3.

16. An article comprising a film of the aqueous coating agent according to claim 4.

17. An article comprising a film of the aqueous coating agent according to claim 5.

18. A metal article comprising a film of the aqueous coating agent according to claim 2.

19. A metal article comprising a film of the aqueous coating agent according to claim 3.

20. A metal article comprising a film of the aqueous coating agent according to claim 4.

21. A metal article comprising a film of the aqueous coating agent according to claim 5.

* * * * *